March 19, 1963   B. P. BAKER   3,082,308
CIRCUIT INTERRUPTER
Filed Dec. 6, 1957   9 Sheets-Sheet 1

INVENTOR
Benjamin P. Baker
BY
Willard R. Crout
ATTORNEY

March 19, 1963 B. P. BAKER 3,082,308
CIRCUIT INTERRUPTER
Filed Dec. 6, 1957 9 Sheets-Sheet 5

March 19, 1963  B. P. BAKER  3,082,308
CIRCUIT INTERRUPTER
Filed Dec. 6, 1957  9 Sheets-Sheet 8

March 19, 1963  B. P. BAKER  3,082,308
CIRCUIT INTERRUPTER
Filed Dec. 6, 1957  9 Sheets-Sheet 9

United States Patent Office 3,082,308
Patented Mar. 19, 1963

3,082,308
CIRCUIT INTERRUPTER
Benjamin P. Baker, Monroeville, Pa., assignor to Westinghouse Electric Corporation, East Pittsburgh, Pa., a corporation of Pennsylvania
Filed Dec. 6, 1957, Ser. No. 701,226
26 Claims. (Cl. 200—147)

This invention relates to circuit interrupters in general and, more particularly, to circuit interrupters of the fluid-blast type.

In United States patent application filed December 20, 1956, Serial No. 629,604, now United States Patent 2,866,045, issued December 23, 1958, to Winthrop M. Leeds, entitled "Circuit Interrupters and Contact Arrangements Therefor," and assigned to the assignee of the instant application, there is disclosed and claimed a circuit interrupter utilizing a single terminal-bushing construction. An interrupting unit is supported at one end of the single terminal bushing within a surrounding cylindrically-shaped weather-proof casing, and operation of the interrupting unit is effected by a pair of longitudinally extending insulating operating rods, which are reciprocally moved by a cranking mechanism disposed adjacent the grounded intermediate supporting housing for the bushing.

It is a general object of the present invention to improve, and render more effective, a circuit interrupter of the foregoing type.

Another object of the present invention is to provide an improved interrupting structure for extinguishing the arc established in a circuit interrupter.

A further object of the invention is to provide an improved interrupting structure in which a permanent magnet is employed to effect rotation of the established arc.

A further object of the present invention is to bring about rotation of the arc in an annular orifice by an improved structure.

Still a further object of the present invention is to cause the rotation of an established arc in an annular orifice, while at the same time causing a simultaneous blast of fluid along the arc stream.

Another object of the present invention is to provide an improved interrupting structure in which improved piston means is employed to effect a fluid blast across the arc to facilitate the extinction thereof.

Another object of the present invention is to provide a plurality of serially related interrupting structures employing a plurality of spaced pistons, in which the exhaust pressure from one interrupting unit may be employed to assist the opening driving motion of the adjoining piston.

Still a further object of the present invention is to provide an elongated insulating casing having disposed therein, and spaced therealong, a plurality of interrupting structures utilizing a plurality of pistons, in which the pressure within the inlet and exhaust regions for the several interrupting structures is so regulated as to bring about more effective arc interruption and facilitated piston movement.

Yet a further object of the present invention is to provide an improved interrupting assembly, which may be quickly placed in an operating position and readily removed from a supporting structure.

Another object of the present invention is to provide an improved circuit interrupter of the single bushing type, in which excessive pressure within a surrounding weather-proof casing is prevented by employing an interiorly disposed insulating interrupting casing, within which the fluid exhaust pressure is discharged.

Another object of the present invention is to provide an improved circuit interrupter including a plurality of serially related interrupting units, in which the several interrupting units and the movable contact structure may be mounted interiorly of an elongated insulating tube.

A further object of the present invention is to provide an improved circuit interrupter utilizing a plurality of serially related interrupting units mounted upon a longitudinally extending insulating supporting tube, in which said insulating supporting tube becomes a tension member, which places a surrounding porcelain casing under compression.

Further objects and advantages will readily become apparent upon reading the following specification, taken in conjunction with the drawings, in which.

Figures 1, 4:
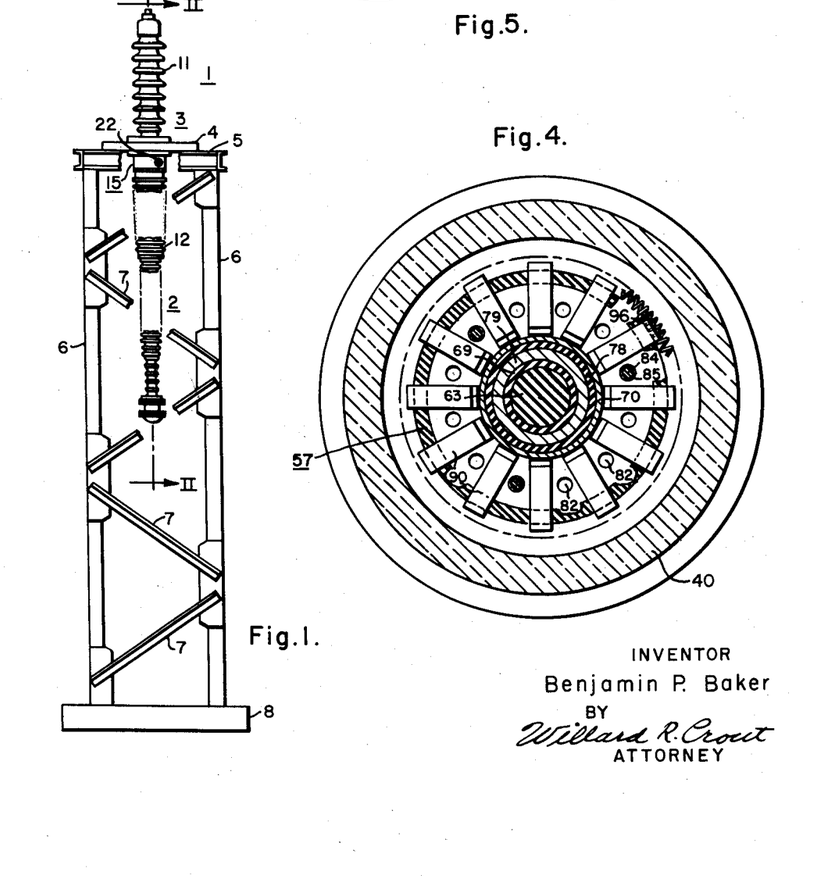
FIG. 1 is a side elevational view of a circuit interrupter embodying the present invention.
FIG. 4 is a plan view, in section, taken along the line IV—IV of FIG. 2D.

Referring to the drawings, and more particularly to FIG. 1 thereof, the reference numeral 1 generally designates a circuit interrupter of the fluid-blast type. Although it will be obvious to those skilled in the art that certain features of the invention will be applicable to all circuit interrupters, regardless of rating, for purposes of illustration, and not by way of limitation, the circuit interrupter 1 is applicable to a 230 k.v. line with an interrupting capacity of 15,000 m.v.a.

As shown in FIG. 1, the circuit interrupter 1 includes an interrupting assemblage, generally designated by the reference numeral 2, secured adjacent the lower end of a single terminal bushing, generally designated by the reference numeral 3. The intermediate grounded flange supporting plate 4 of the terminal bushing 3 is supported upon a supporting angle-iron framework, including horizontal braces 5, vertical angle-iron supports 6, and diagonally extending supporting braces 7. Preferably the angle-iron supporting structure is supported upon a concrete base 8.

Figure 2A:
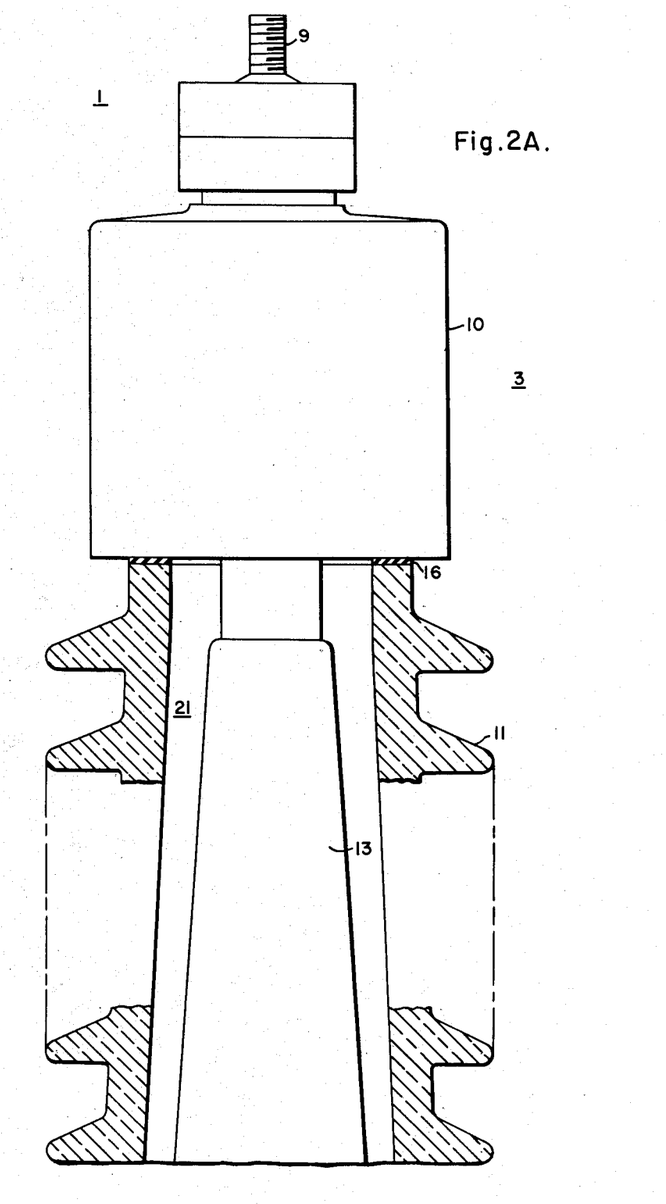
FIGS. 2A–2E collectively illustrate a longitudinal cross-sectional view taken along the line II—II of FIG. 1, the several contact structures being shown in the closed-circuit position.

FIGS. 2A–2E collectively illustrate a vertical cross-sectional view through the circuit interrupter 1. With particular reference to FIG. 2A, it will be noted that the terminal bushing 3 includes a terminal stud 9, a cap structure 10, interiorly of which may be disposed a compression-spring structure, which resiliently maintains the porcelain weather-proof casings 11, 12 of the bushing 3 in compression, as well understood by those familiar with terminal bushings.

The central core 13 of the bushing 3 may consist of a winding of a suitable paper-like material having interspersed therein at proper spacings the foil layers, which constitute the condenser elements of the terminal bushing 3.

Figure 2B:
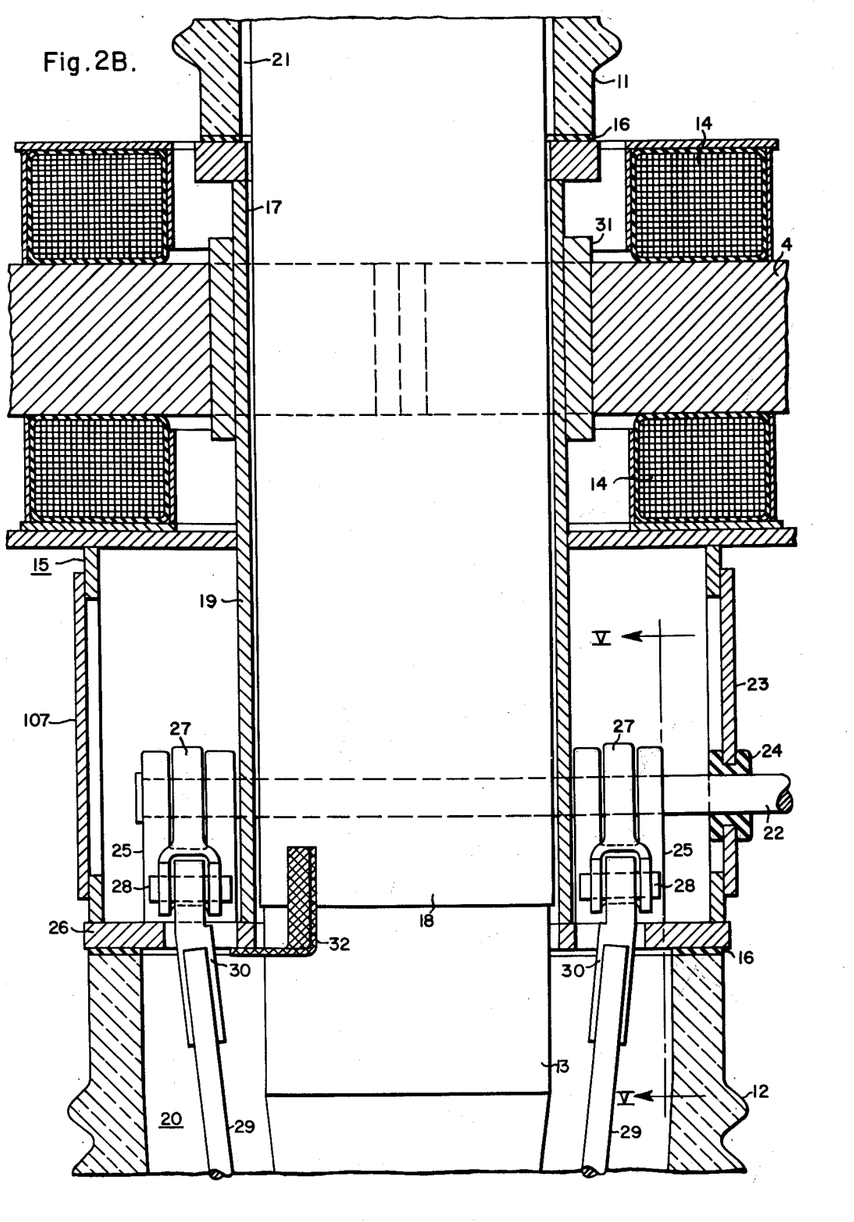

FIG. 2B shows the lower end of the porcelain shell, or casing 11, together with the current transformers 14, the intermediate grounded supporting housing, generally designated by the reference numeral 15, and the upper portion of the lower porcelain casing 12.

The current transformers 14 are preferably arranged and mounted to obtain differential relay protection, as set out and claimed in United States patent application filed March 31, 1958, Serial No. 725,286, by Benjamin P. Baker and Robert F. Karlicek, and assigned to the assignee of the instant application, now U.S. Patent No. 3,032,689.

Preferably ring-shaped gaskets 16 are employed to provide a gas-tight construction. As will be brought out hereinafter, preferably, a high-dielectric-strength gas, such as $SF_6$ or $SeF_6$, or mixtures of either, or both, of the aforesaid gases with other gases, such as air, nitrogen, hydrogen, argon, helium and carbon dioxide may be used within the circuit interrupter 1.

It will be observed that an annular space 17 (FIG. 2B) is provided between the exterior grounded layer 18 on the core 13 of the bushing 3, and a surrounding supporting sleeve 19, the latter being fixedly secured, as by welding, to the grounded supporting housing 15. Thus, the high-dielectric-strength gas may pass through the annular space 17 from the lower region 20 upwardly to the region 21 interiorly within the upper porcelain shell 11, so that the voltage-withstanding ability of the terminal bushing 3 will be increased. As will be more fully explained hereinafter, the gas within the regions 20, 21 preferably has not only the characteristic of having high-dielectric strength, but also good arc-extinguishing properties.

Passing laterally through the housing 15 is a rotatable shaft 22, which may be rotated by any suitable external mechanism. The shaft 22 preferably passes in a gas-tight manner through the side plate 23 of the supporting housing 15, a sealing grommet 24 being illustrated, although in practice, a sealing sleeve construction, as set out in the aforesaid Leeds patent may be used.

Figure 5:
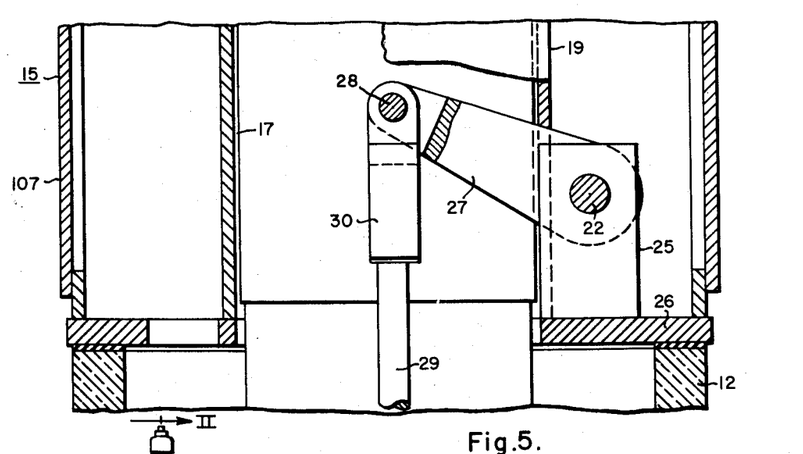
FIG. 5 is a sectional view taken along the line V—V of FIG. 2B, with the operating rods being shown in their open-circuit position.

The rotatable shaft 22 is journaled within two bifurcated supporting brackets 25 (FIG. 5) the latter being secured, as by welding, to a horizontally extending supporting plate 26. Fixedly keyed to the rotatable crank shaft 22 is a pair of bifurcated crank arms 27, having pivoted thereto, at the outer ends thereof, by pivot pins 28 a pair of downwardly extending operating rods 29. As well known by those skilled in the art, the upper ends of the insulating operating rods 29 may have fixedly secured thereto, as by a press fit, a pair of metallic rod ends 30.

With further reference to FIG. 2B, it will be noted that fixedly secured to the supporting grounded sleeve 19, as by welding, is a support sleeve 31, which, in turn, may be welded to the supporting plate 4. A grounding connection 32 may be provided between the grounding layer 18 of the core 13 and the grounded supporting plate 26.

Figure 2C:
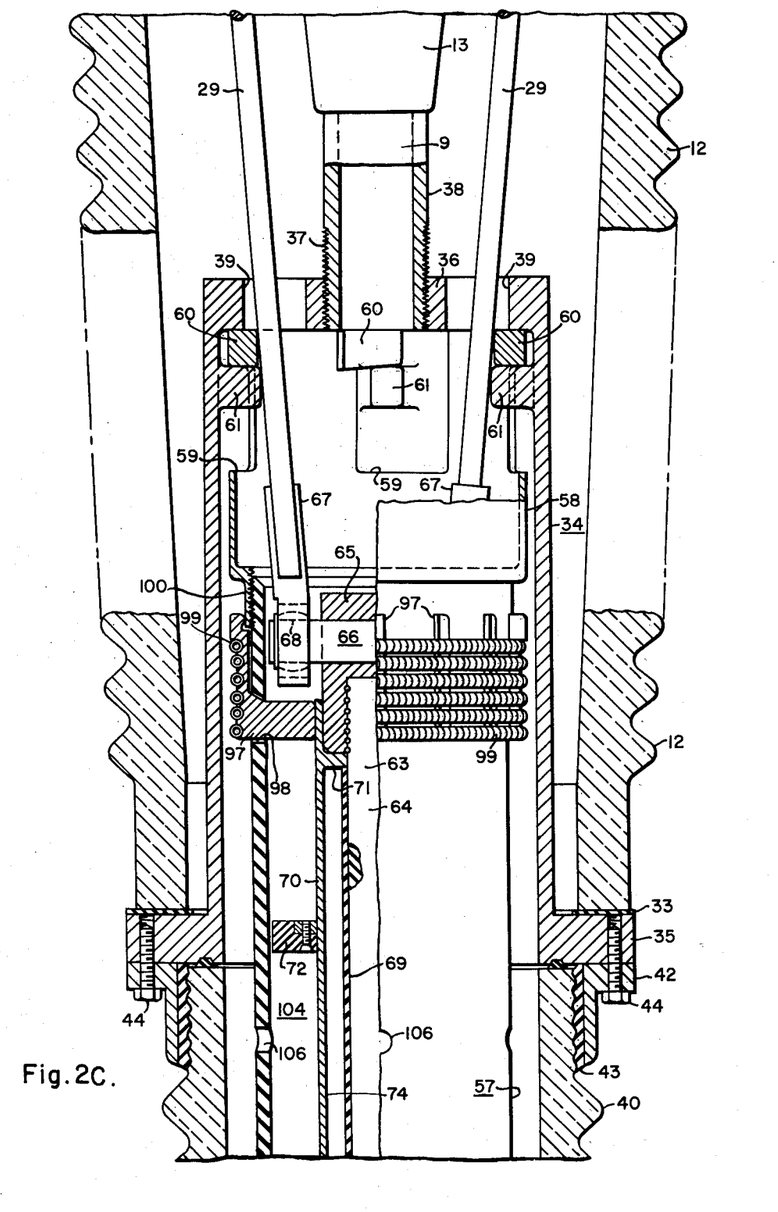

With attention being directed to FIG. 2C, it will be observed that the lower weather-proof shell 12, in this instance being formed of porcelain, rests upon a gasket 33, which, in turn, bears against the cylindrically-shaped terminal-bushing end clamp 34, which has a radially outwardly extending flange portion 35. The upper end of the bushing end clamp 34 has an inwardly extending threaded supporting plate portion 36, which preferably is threaded, as at 37, to the lower threaded extremity 38 of the terminal stud 9.

As shown in FIG. 2C, the upper supporting plate portion 36 has a pair of apertures 39 provided therethrough, through which project the lower ends of the insulating operating rods 29.

Figure 2D:
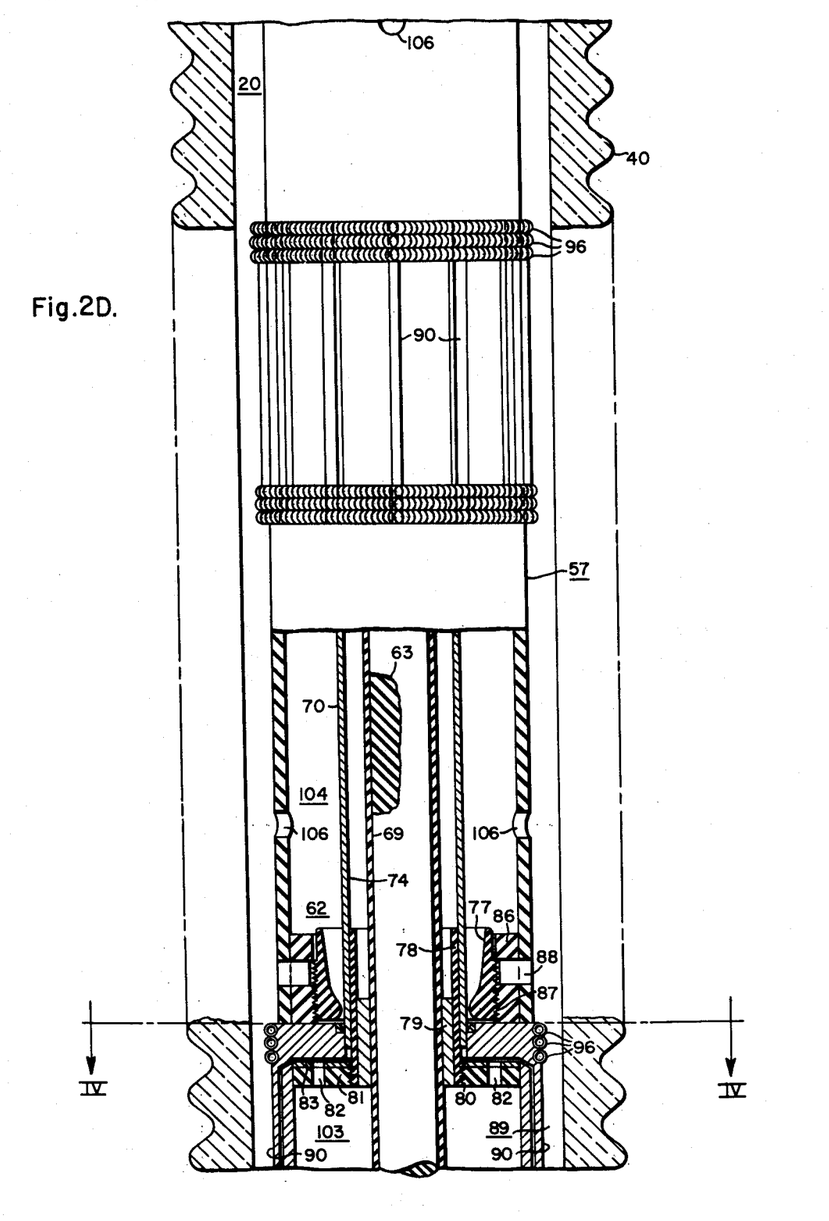
Figure 2E:
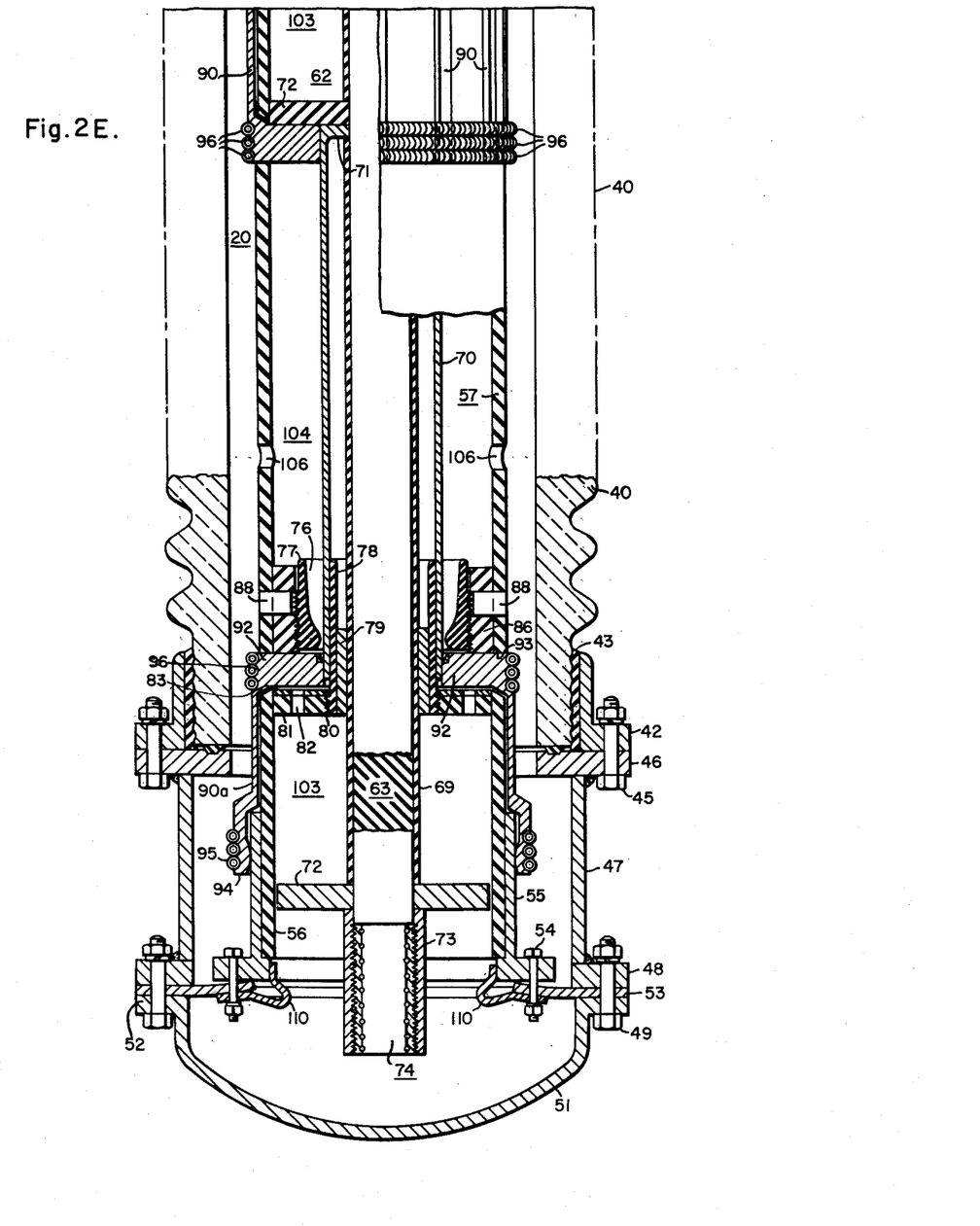

With reference to FIGS. 2D and 2E, it will be noted that there is provided a downwardly extending cylindrical casing 40, preferably composed of a suitable weatherproof material, such as porcelain. Flange rings 42 are secured, as by cement 43, to the upper and lower extremities of the porcelain casing 40. A plurality of circumferentially spaced mounting bolts 44 are provided to secure the upper flange ring 42 to the flange portion 35 of the bushing end clamp 34. Further mounting bolts 45 may be employed to secure the lower flange ring 42 to a flange ring 46 (FIG. 2E), which is preferably welded to a lower housing cylinder 47. The lower end of the housing cylinder 47 has welded thereto a further flange ring 48, to which is bolted, as by means of mounting bolts 49, a lower closure cap 51.

Interposed between the flange ring 48 and a flange portion 52 of the lower closure cap 51 is a holddown pressure plate 53. The pressure plate, or pressure ring 53 is bolted, by bolts 54, to a supporting end sleeve 55 of metallic material, which is fixedly secured, as by a press fit, to the lower end 56 of an interiorly disposed, downwardly extending, insulating supporting tension tube, generally designated by the reference numeral 57.

Figure 6:
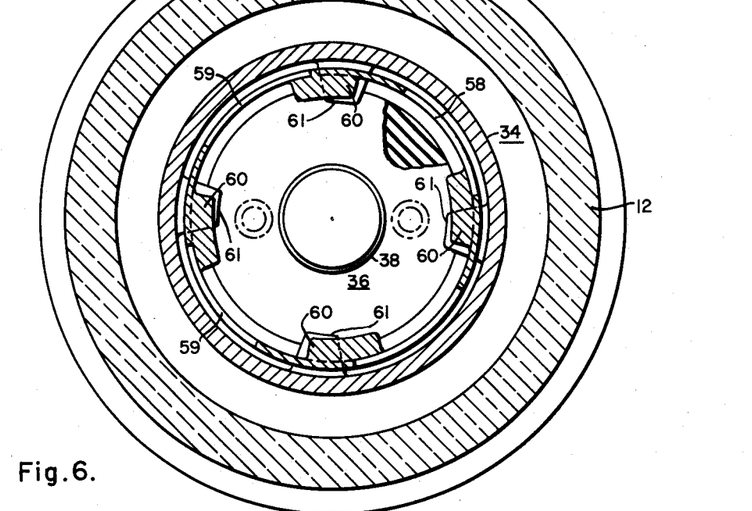
FIG. 6 is an inverted plan view, in cross section, taken along the line VI—VI of FIG. 7.
Figure 7:
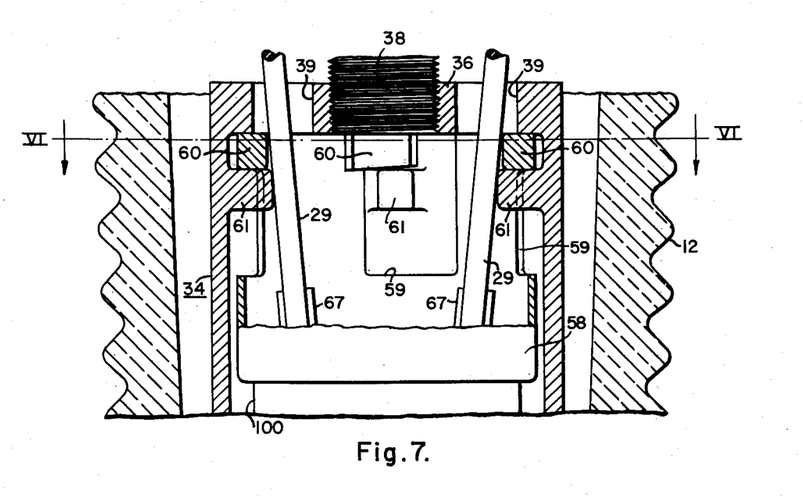
FIG. 7 is a fragmentary, vertical, cross-sectional view taken through the interrupting assemblage, showing only the lower extremity of the terminal stud associated with the terminal bushing.

It will be noted that the interiorly disposed insulating supporting tube 57 extends upwardly within the outer weather-proof casing 40, and has threadedly secured thereto, at its upper end, a supporting end sleeve 58 (FIG. 2C). The upper metallic end sleeve 58 has a plurality of slots 59 provided therein. The upper end of one side of each slot 59 has an integrally formed tapered hook 60, which hooks over a cooperating, inwardly extending, supporting lug 61. The latter is integrally formed with the bushing end clamp 34. Thus, as more clearly shown in FIGS. 2C, 6 and 7, one may insert the upper slotted supporting end sleeve 58 around the inwardly projecting supporting lugs 61, and by means of a suitable tool secured to the lower supporting end sleeve 55, cause the rotative, counterclockwise, locking motion of the hooks 60 over the tops of the lugs 61. Because of the tapered configuration of the supporting hooks 60, as more clearly shown in FIG. 7, the upper supporting end sleeve 58 may be locked into position.

An important feature of the present invention is the fact that when the insulating supporting tube 57 is locked into position, by the rotation thereof, so that the tapered hooks 60 lock over the supporting lugs 61, and when the mounting bolts 54 (FIG. 2E) are tightened, the reaction upon the pressure plate 53 is such as to cause the compression of the porcelain casing 40. Naturally this compression of porcelain shell 40 is caused by tensile stress along the supporting tube 57, but the supporting tube 57 is composed of a high-strength material. Thus, the supporting tube 57 not only supports the several interrupting units 62, as more fully brought out hereinafter, but in addition thereto, it maintains the lower porcelain casing 40 under compression and thereby maintains the entire structure more rigid.

Figure 3:
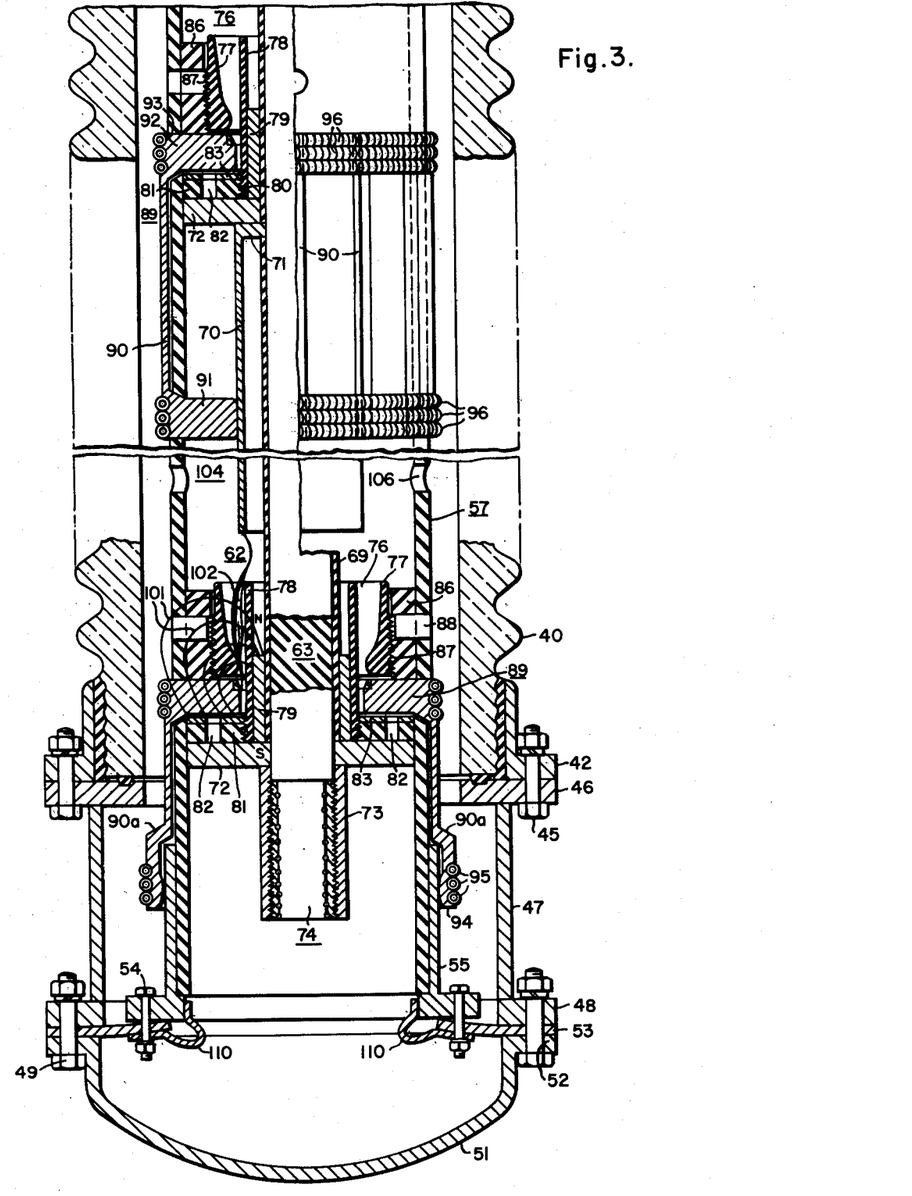
FIG. 3 is a vertical sectional view taken through the lower extremity of the interrupting assemblage of the circuit interrupter of FIG. 1, being a view generally similar to the view of FIG. 2E, but with the contact structure being illustrated in the fully open-circuit position.

The construction of each of the three provided interrupting units 62 will now be explained. With reference to FIGS. 2C and 3, it will be observed that extending downwardly centrally through the supporting tube 57 is an insulating tie-rod, which serves as an operating rod for the movable contact structure. The upper end 64 of the insulating tie rod 63 has threadedly secured thereto an upper metallic fitting 65, through which passes a pivot pin 66. The lower ends of the insulating operating rods 29 have metallic rod ends 67 secured thereto, as by a press fit, and these rod ends 67 have apertures 68 therethrough, through which extend the outer ends of the pivot pin 66, as shown in FIG. 2C.

Immediately surrounding the insulating tie-rod 63, which functions as an operating rod, is a plurality of insulating spacing sleeves 69. The spacing sleeves 69 space the elements, constituting the movable contact structure, fixedly to the reciprocally movable operating rod 63. As shown in FIG. 2C, immediately below the upper end fitting 65 is a cylindrically-shaped first movable contact 70, having adjacent its upper end an inwardly extending flange portion 71. As shown in FIG. 2C the portion 71 has a relatively close fit over the operating or tie-rod 63. Then follows an insulating spacing sleeve 69, a first fluid-driving ring-shaped movable piston member 72, not shown, disposed within the upper unit 62 in FIG. 2D, a second cylindrically-shaped movable contact 70, (lower portion of FIG. 2D) substantially identical with the upper first movable contact 70 with the exception that the flange portion 71 of second movable contact 70 is at the extreme upper end thereof. Then follows a second insulating spacing sleeve 69, a second ring-shaped fluid-driving piston 72, (lower portion of FIG. 2D) a third cylindrical movable contact 70 (FIG. 2E) identical with the second movable contact 70. Then follows a third insulating spacing sleeve 69, (lower portion of FIG. 2E) a third ring-shaped movable fluid-driving piston 72, (lower portion of FIG. 2E) and an end sleeve clamp 73, which is threadedly secured to the lower extremity of the insulating tie-rod 63, as shown more fully in FIGS. 2E and 3.

With reference to FIG. 2C, it will be observed that an additional piston 72 functioning as an exhaust piston, is secured to the upper outer side of the top movable contact 70, for reasons set forth below.

The several movable contacts 70 and the piston members 72 are, as described, fixedly secured to, and carried with the insulating operating rod 63, the latter being actuated by the upper pair of insulating operating rods 29. This movable contact assemblage may be designated generally by the reference numeral 74. It will be noted, with reference to FIGS. 2E and 3, that this movable contact assemblage 74 moves centrally, and axially, of the insulating supporting tension tube 57.

Another important advantage of the present invention is that the elements, which constitute the stationary parts of the interrupting units 62 are all supported by the single supporting tension tube 57, and, as a result of this, upon downward removal of the insulating supporting tube 57 downwardly out of the surrounding, porcelain casing 40, the several interrupting elements are removed therewith, so that inspection or replacement of parts may be readily made. More specifically, each interrupting unit 62 includes means defining a fixed annular orifice passage, generally designated by the reference numeral 76. This annular orifice passage 76 is defined by a fixed outer cylindrically-shaped orifice member 77, preferably composed of polytetrafluoroethylene, when either $SF_6$ or $SeF_6$ is used as the arc-extinguishing and dielectric gas. As set out in United States Patent 2,757,261, issued July 31, 1956 to Harry J. Lingal, Thomas E. Browne, Jr. and Albert P. Strom, and assigned to the assignee of the instant application, polytetrafluoroethylene resists erosive action of the arc, when drawn in a medium constituted by one of the aforesaid gases.

An inner fixed stationary sleeve 78, also formed of polytetrafluoroethylene cooperates with the outer orifice member 77 to define the fixed annular orifice passage 76. Inwardly of the inner sleeve 78 is a permanent magnet sleeve 79. The permanent magnet sleeve 79 may be inserted with a press fit within the inner fixed sleeve 78, the latter having one end thereof threaded, as at 80, to a washer-like retainer member 81, having a plurality of apertures 82 provided circumferentially therearound, as more clearly illustrated in FIG. 4 of the drawings.

Disposed immediately above the stationary retainer ring 81 is a washer-shaped member 83 composed of a suitable magnetic material, in this particular instance iron. Preferably the iron ring 83 has apertures 82 provided therein, which register with the holes 82 provided in the retainer ring 81.

Thus, the retainer ring 81 supports the iron washer 83, the inner insulating sleeve 78 and the permanent magnet sleeve 79. The retainer ring 81 itself is supported by a plurality of supporting bolts 84 (FIG. 4) and surrounding sleeves 85, passing through some of the holes 82, to be secured to an upper insulating retainer sleeve 86, the latter having a threaded attachment, as at 87 to the outer orifice member 77.

The upper retainer sleeve 86 of each interrupting unit 62 is removably secured into position interiorly within the supporting tension tube 57 by a plurality of mounting pins 88, extending circumferentially around the tube 57 at each interrupting unit 62.

The stationary contact structure, generally designated by the reference numeral 89, for each interrupting unit 62 is constituted by a plurality, in this particular instance twelve, U-shaped stationary bridging contacts 90, each of which has a lower inwardly extending portion 91 (FIG. 3), which makes a sliding connection with the movable contact tube 70 therebeneath. The upper end 92 of each U-shaped stationary bridging contact 90 projects through an opening 93 in the tube 57. The inner ends of the upper end portions 92 of the several U-shaped bridging contacts 90 cooperate with the lower annular surface of each movable contact 70, as more clearly shown in FIG. 2E of the drawings.

The stationary contacts 90a for the lowermost interrupting unit 62 have a slightly different construction, as shown in FIGS. 2E and 3. The stationary contacts 90a have downwardly extending finger portions 94, biased inwardly against the sides of the lower supporting end sleeve 55 by a plurality of garter springs 95. The U-shaped bridging contacts 90 of the stationary contact structure 89 are biased inwardly by a plurality of additional garter springs 96.

With particular reference being directed to FIG. 2C, it will be noted that the current transfers from the upper movable contact 70 by means of a plurality of inwardly extending stationary fingers 97, which project through openings 98 in the tube 57. These stationary fingers 97 are biased inwardly by a plurality of additional garter tension springs 99, so that the fingers 97 make sliding, contacting engagement with the external surface of the upper movable contact 70. In addition, these fingers make contacting engagement at their upper ends, as shown in FIG. 2C, with the lower threaded sleeve portion 100 of the upper supporting end sleeve 58.

In the closed-circuit position of the interrupter 1, as illustrated in FIGS. 2A–2E, 5–7, the circuit passes through terminal stud 9, extremity 38 (FIG. 2C), bushing end clamp 34, hook lugs 61, metallic hooks 60, supporting end sleeve 58, sleeve portion 100, finger contacts 97, upper movable contact tube 70, upper stationary contact fingers 90 (FIG. 2D), intermediate movable contact tube 70, intermediate contact fingers 90 (FIG. 2D) lower movable contact tube 70 (FIG. 2E), lower contact fingers 90a to metallic supporting end sleeve 55. The circuit then extends through a plurality of flexible connections 110 through pressure ring 53 to the metallic lower closure cap 51. The cap 51 has an integrally formed terminal pad, not shown, to which the external circuit may be connected.

The operation of the several interrupting units 62 will now be explained. Upon rotative movement of the shaft 22, as effected by any suitable external mechanism, the crank arms 27, linked to the operating rods 29, cause upward opening motion of the fitting 65 (FIG. 2C) and the depending movable contact assembly 74. This will cause separation between the lower ends of the several tubular contacts 70 and the U-shaped stationary bridging contacts 90, 90a. An arc will be established within the stationary annular orifice passage 76 of each of three provided interrupting units 62. Since there is associated with each interrupting unit 62 a sleeve-shaped, permanent magnet 79 and a lower iron washer 83, a radial magnetic field will be set up across the annular orifice passage 76 of each interrupting unit 62, as indicated by the dotted lines 101 of FIG. 3. The arc 102, which for purposes of illustration has been drawn in FIG. 3, even though said figure illustrates the fully open-circuit position of the interrupter, rotates about the annular orifice passage 76, as caused by the radial magnetic field set up by the permanent magnet sleeve 79 and the cooperating iron washer 83. Facilitating the extinction of each arc 102 drawn in each interrupting unit 62 is the upward flowing gas blast, as caused by upward driving motion of each movable ring-shaped piston 72.

Comparing FIGS. 2E and 3, it will be observed that each ring-shaped piston 72 causes a diminution of the volume of the inlet region 103 and simultaneously an expansion of the volume of the exhaust region 104. Thus, the insulating supporting tube 57 forms a plurality of inlet regions 103 and a plurality of exhaust regions 104, with the exhaust pressure in each exhaust region 104 facilitating the opening driving movement of the ring-shaped piston 72 disposed immediately thereabove. The top piston 72, shown in FIG. 2C, is not a fluid-driving piston, but merely uses the exhaust pressure in the top exhaust space 104 to assist in driving the movable contact assemblage 74 in the opening direction. Openings, or vent holes 106, in the tube 57 are to control the exhaust pressure from the arc 102 in the exhaust region 104, so that it does not become great enough to interfere with arc extinction, yet is sufficient to contribute appreciably to the driving force on the lower side of each puffer piston 72.

From the foregoing, it will be apparent that intensive arc-extinguishing and cooling action takes place within each of the three interrupting units 62. Not only is each arc 102 rotated around through the annular orifice passage 76, but also there occurs an upward blast of fluid through the holes 82 and between the U-shaped bridging contacts 90. This upward blast of fluid passes upwardly through the annular orifice passage 76 longitudinally of the rotating arc 102, intensifying the cooling thereof and more readily bringing about its extinction. The exhaust pressure in the exhaust region 104 of each interrupting unit 62 facilitates the upward driving movement of the piston 72 immediately thereabove.

Figure 8:
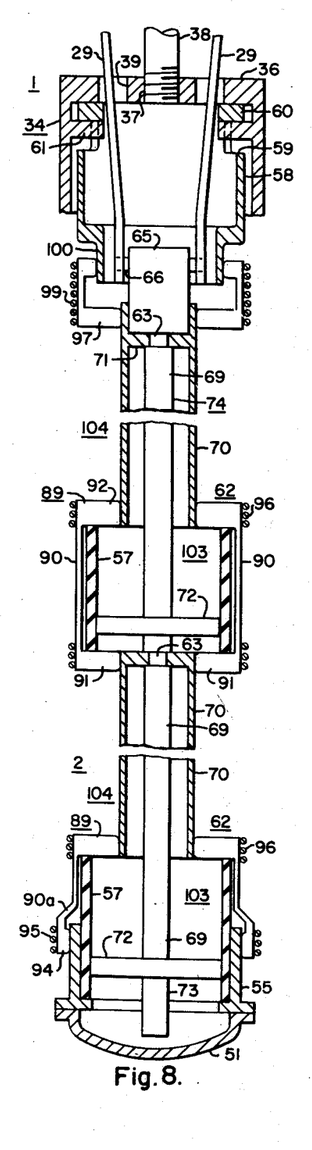
FIG. 8 is a simplified, vertical cross-sectional view of the interrupting assemblage only, with the contact parts being shown in the closed-circuit position.
Figure 9:
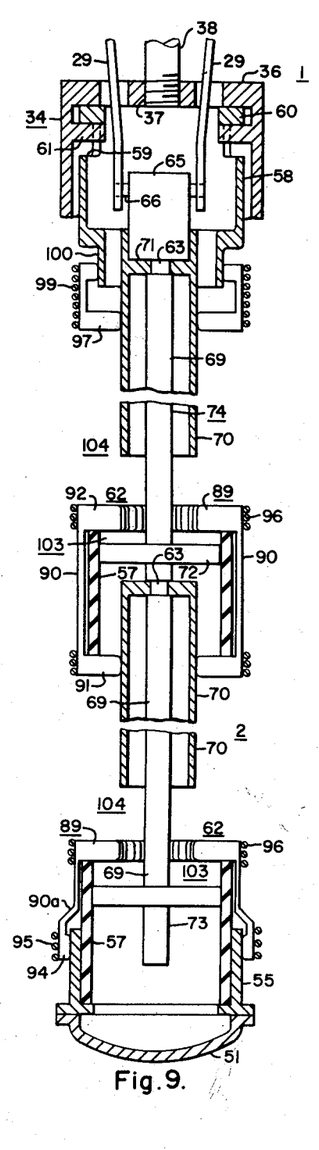
FIG. 9 is a view similar to that of FIG. 8 but showing the parts in the open position.

FIGS. 8 and 9 illustrate, somewhat diagrammatically, in skeleton fashion, the contact structure in the closed and open-circuit positions respectively.

To effect the removal of the several interrupting units 62, it is merely necessary to unscrew the mounting bolts 49, and remove the lower closure cap 51. Then the clamping bolts 54 are loosened and removed. Following this operation, a suitable tool is applied to the lower supporting end sleeve 55 to bring about the rotation thereof, and consequently of the tube 57, to thereby effect an unhooking of the tapered hooks 60 from the tops of the inwardly extending supporting lugs 61. The operating rods 29 are disconnected from the crank arms 27 by removal of the pivot pins 28, this operation being readily effected by removal of the cover plate 107 associated with the grounded housing 15.

When the foregoing operations have been accomplished the entire insulating tension tube 57, together with all the elements comprising the three interrupting units 62 may be removed downwardly, and out of the depending casing 40. Once the insulating tube 57 has been removed from the casing 40 the operating rods 29 may be detached from the fitting 65 by removal of the pivot pin 66. To effect a complete disassembly of the several interrupting units 62, one need merely to remove the several mounting pins 88 and move the several garter springs 95, 96, 99 off of the contacts and onto the tube 57. The several bridging contacts 90, 90a and 97 may then be laterally removed out of the tube 57. When this is done, the entire movable contact assemblage 74 may be slid downwardly and out of the supporting tube 57, carrying with it the stationary sub-assemblies of the several interrupting units 26.

From the foregoing description, it will be apparent that there is provided an improved circuit interrupter particularly adaptable for high-voltage service, such as 230 k.v. and 15,000 m.v.a. It will be noted that the interrupting units 62 are mounted on the end of a condenser bushing 3 and are actuated by a suitable mechanism through the pressure seal 24, associated with the grounded housing 15.

Effective arc-extinguishing action is achieved by the arc 102 being drawn in an annular orifice 76, in which it is rotated by a radial magnetic field. The exhaust gases after having passed through the arc 102, discharge into a heavy insulating tube 57 instead of discharging directly into a porcelain weather-proof casing 40. This has the advantage of removing excessive pressure from the porcelain shell 40.

It will be noted that the tube 57 becomes a tension member, which places the porcelain shell 40 in compression. In addition, the exhaust gas in the tube 57 is allowed to build up back pressure, to assist in driving the piston 72 of the adjacent interrupter 62. The interrupters 62 are all enclosed in the tube 57, and are removable as a unit. The contacts 90 are rugged, have heavy cross-sections, and are easily removed. The porcelain weather casing 40 for the interrupters 62 is made in one piece, instead of one piece for each interrupter. This is less expensive, and takes up less space.

The tube 57 may be of an epoxy, polyester or phenolic base, in and on which all interrupter details are mounted. This tube 57 forms a tension member and places the porcelain 40 in compression by deflecting the hold-down pressure plate 53, located at the bottom of the breaker.

It will be noted that the moving element 74 consists of a fitting 65, preferably a glass-filled polyester or epoxy center tie-rod 63, moving contact 70 and preferably glass-filled polyester or epoxy spacers 69. Pistons 72 are also clamped to the center tie rod by the lower clamping member 73. These several parts are all stacked upon the rod 63, and are clamped together. Thus, the construction is very compact.

For high values of current being interrupted by the circuit interrupter 1, the arc 102 of each interrupting unit 62 may entirely fill the annular arc passage 76. For servicing in the field it is assumed that one complete interrupter "capsul" including the tube 57, would be removed and replaced by a reconditioned one. It will be furthermore observed that many of the parts forming the three interrupting units 62 are identical, and repeat as they are stacked into a multi-interrupter unit.

From the foregoing it is readily apparent that there is illustrated and described a novel circuit interrupter, one particularly adapted for high-power service, but features of which are readily applicable to low-voltage applications. Arc interruption is highly effective, and the balancing of the pressure conditions within the tube 57 brings about a state of affairs, where little force is needed by the crank 27 to effect motion of the movable contact structure 74 and the several pistons 72 carried therewith.

Not only is the arc-extinguishing gas employed in the interrupting units 62, but also it is permitted to leak through the annular passage 17 (FIG. 2B) and entirely along the axial length of the bushing 3 within the external shells 11, 12 to thereby increase the dielectric strength of the terminal bushing 3. This feature is described and claimed in United States patent application S.N. 609,915, filed September 14, 1956, by Robert E. Friedrich, and assigned to the assignee of the instant application, now U.S. Patent No. 2,967,221.

Although there has been shown and described a specific circuit interrupter, it is to be clearly understood that the same was merely for the purpose of illustration, and that changes and modifications may readily be made therein by those skilled in the art, without departing from the spirit and scope of the invention.

I claim as my invention:

1. A circuit interrupter including means defining a stationary annular orifice passage, an operating rod reciprocally movable through the center of said stationary annular orifice passage and carrying a cylindrically-shaped movable contact therewith, a relatively stationary contact cooperable with said cylindrically-shaped movable contact to establish an arc within the stationary annular orifice passage, said relatively stationary contact including a plurality of circumferentially-spaced finger contacts, fluid passage means associated with the spaces between said plurality of finger contacts, said rod carrying a fluid driving piston on the side of said fingers away from the movable contact, and means setting up a radial magnetic field across said annular orifice passage to effect the rotation of the arc within said annular orifice passage.

2. A circuit interrupter including means defining a stationary annular orifice passage, an operating rod reciprocally movable through the center of said stationary annular orifice passage and carrying a cylindrically-shaped movable contact therewith, a relatively stationary contact cooperable with said cylindrically-shaped movable contact to establish an arc within the stationary annular orifice passage, said relatively stationary contact including a plurality of circumferentially-spaced finger contacts, fluid passage means associated with the spaces between said plurality of finger contacts, said rod carrying a fluid driving piston on the side of said fingers away from the movable contact, and means including a permanent magnet setting up a radial magnetic field across said annular orifice passage to effect the rotation of the arc within said annular orifice passage.

3. A circuit interrupter including means defining a stationary annular orifice passage, an operating rod reciprocally movable through the center of said stationary annular orifice passage and carrying a cylindrically-shaped movable contact therewith, a relatively stationary contact cooperable with said cylindrically-shaped movable contact to establish an arc within the stationary annular orifice passage, said relatively stationary contact including a plurality of circumferentially-spaced finger contacts, fluid passage means associated with the spaces between said plurality of finger contacts, said rod carrying a fluid driving piston on the side of said fingers away from the movable contact, and a cylindrical permanent magnet surrounding said movable operating rod for setting up a radial magnetic field across said annular orifice passage to effect the rotation of the arc within said annular orifice passage.

4. The combination in a circuit interrupter of an elongated insulating unitary one-piece casing, an operating rod movable axially within said insulating casing and carrying a plurality of cylindrically-shaped movable contacts therewith, means defining a plurality of spaced stationary annular orifice passages, said operating rod being reciprocally movable through the center of said stationary annular orifice passages, means defining a plurality of serially related stationary contacts, said cylindrically-shaped movable contacts being separable from said serially related stationary contacts to establish a plurality of serially related arcs within said spaced stationary annular orifice passages, and means for setting up a radial magnetic field across each annular orifice passage to effect the rotation of the arc therein.

5. The combination in a circuit interrupter of an elongated insulating unitary one-piece casing, an operating rod movable axially within said insulating casing and carrying a plurality of cylindrically-shaped movable contacts therewith, means defining a plurality of spaced stationary annular orifice passages, said operating rod being reciprocally movable through the center of said spaced stationary annular orifice passages, means defining a plurality of serially related stationary contacts, said cylindrically-shaped movable contacts being separable from said serially related stationary contacts to establish a plurality of serially related arcs within said spaced stationary annular orifice passages, and means including a plurality of permanent magnet sleeves surrounding said operating rod for setting up a radial magnetic field across each annular orifice passage to effect the rotation of the arc therein.

6. The combination in a fluid-blast circuit interrupter of an elongated insulating tubular one-piece casing, means defining a plurality of stationary annular orifice passages spaced therealong, an inlet region and an exhaust region associated with each stationary annular orifice passage, an operating rod reciprocally movable axially of said tubular casing and carrying a plurality of spaced pistons therewith, said pistons being arranged to decrease the volume of each inlet region and expand the volume of each exhaust region, at least one of said movable pistons separating the exhaust region of one stationary annular orifice passage from the inlet region of the immediately adjacent stationary annular orifice passage so that the exhaust pressure will assist piston travel, said operating rod carrying a plurality of movable contacts, a plurality of relatively stationary contacts, means connecting said contacts in series relation, and the reciprocal movement of said pistons forcing a flow of fluid through said annular orifice passages to effect the extinction of the arcs therein.

7. The combination in a fluid-blast circuit interrupter of an elongated insulating tubular casing, means defining a plurality of stationary annular orifice passages spaced therealong, an inlet region and an exhaust region associated with each stationary annular orifice passage, an operating rod reciprocally movable axially of said tubular casing and carrying a plurality of spaced pistons therewith, said pistons being arranged to decrease the volume of each inlet region and expand the volume of each exhaust region, at least one of said movable pistons separating the exhaust region of one stationary annular orifice passage from the inlet region of the immediately adjacent stationary annular orifice passage so that the exhaust pressure will assist piston travel, said operating rod carrying a plurality of movable contacts, a plurality of relatively stationary contacts, means connecting said contacts in series relation, means for establishing a radial magnetic field across one or more of said spaced stationary annular orifice passages to effect rotation of the established arc therein, and the reciprocal movement of said pistons forcing a flow of fluid through said annular orifice passages to effect the extinction of the arcs therein.

8. The combination in a fluid-blast circuit interrupter of an elongated insulating tubular casing, means defining a plurality of stationary annular orifice passages spaced therealong, an inlet region and an exhaust region associated with each stationary annular orifice passage, an operating rod reciprocally movable axially of said tubular casing and carrying a plurality of spaced pistons therewith, said pistons being arranged to decrease the volume of each inlet region and expand the volume of each exhaust region, at least one of said movable pistons separating the exhaust region of one stationary annular orifice passage from the inlet region of the immediately adjacent stationary annular orifice passage so that the exhaust pressure will assist piston travel, said operating rod carrying a plurality of movable contacts, a plurality of relatively stationary contacts, means connecting said contacts in series relation, the reciprocal movement of said pistons forcing a flow of fluid through said annular orifice passages to effect the extinction of the arcs therein, and venting means associated with the exhaust regions for governing the increase of pressure therein.

9. The combination in a fluid-blast circuit interrupter of an elongated insulating tubular casing, means defining a plurality of stationary annular orifice passages spaced therealong, an inlet region and an exhaust region associated with each annular orifice passage, an operating rod reciprocally movable axially of said tubular casing and carrying a plurality of spaced pistons therewith, said pistons being arranged to decrease the volume of each inlet region and expand the volume of each exhaust region, at least one of said movable pistons separating the exhaust region of one stationary annular orifice passage from the inlet region of the immediately adjacent stationary annular orifice passage so that the exhaust pressure will assist piston travel, said operating rod carrying a plurality of movable contacts, a plurality of relatively stationary contacts, means connecting said contacts in series relation, a permanent magnet sleeve associated with each stationary annular orifice passage to effect the rotation of the arc therein, and the reciprocal movement of said pistons forcing a flow of fluid through said stationary annular orifice passages to effect the extinction of the arcs therein.

10. A circuit interrupter of the single bushing type including an external casing disposed at one end thereof, an internal insulating tension tube, interrupting elements carried by said insulating tension tube, means removably locking one end of said insulating tension tube to one end of said terminal bushing, and compression establishing means associated with the other end of said tension tube to place said external casing under compression.

11. A circuit interrupter including an external casing, an internally disposed insulating casing, interrupting elements supported by said internally disposed insulating casing, a slotted sleeve-like member associated with the inner end of said internal casing having laterally extending hook lugs, supporting means within said external casing having inwardly extending latching lugs, and the rotative locking movement of said internal casing effecting locking supporting engagement between said hook lugs and said latching lugs.

12. A circuit interrupter including an outer frangible ceramic weather-proof casing, an inner insulating interrupting tube disposed interiorly of said outer frangbile ceramic casing, one or more interrupting units associated with the inner interrupting tube, means for establishing an arc within each interrupting unit, relatively restricted venting means for said inner tube to restrict the venting thereof into said outer frangible ceramic casing, means including said inner tube as a tension member for maintaining said outer casing under compression, and the exhaust products from each interrupting unit discharging interiorly of said inner insulating interrupting tube so as to relieve the outer frangible ceramic casing from the pressure of the exhaust products resulting from the interruption process.

13. A circuit interrupter of the fluid-blast type including an interrupting tube, an operating rod movable longitudinally through said interrupting tube and carrying a plurality of spaced movable contacts and a plurality of spaced piston members therewith, a plurality of spaced stationary contacts cooperable with said spaced movable contacts to establish a plurality of serially related arcs, each piston member cooperating with said interrupting tube to force fluid to flow toward an arc, at least one of said movable pistons separating the exhaust region of one arc from the inlet region of the immediately adjacent arc, and the exhaust pressure from one arc assisting the adjoining piston to move so as to force fluid toward the adjoining arc.

14. A circuit interrupter of the fluid-blast type including an outer casing and an interiorly disposed interrupting tube, an operating rod movable longitudinally through said interrupting tube and carrying a plurality of spaced movable contacts and a plurality of spaced piston members therewith, a plurality of spaced stationary contacts cooperable with said spaced movable contacts to establish a plurality of serially related arcs, said inner interrupting tube at least partially defining an inlet region and an exhaust region for each arc, at least one of said movable pistons separating the exhaust region of one arc from the inlet region of the immediately adjacent arc, venting means associated with the exhaust regions permitting venting of the exhaust pressure within said interrupting tube to the region within said outer casing, each piston member cooperating with said interrupting tube to force fluid to flow toward an arc, and the exhaust pressure from one arc assisting the adjoining piston to move so as to force fluid toward the adjoining arc.

15. A circuit interrupter of the single bushing type including only a single terminal bushing, said terminal bushing including a pair of axially disposed weather-proof casings with mounting means disposed between the two weather-proof casings, a terminal stud extending axially through the terminal bushing, a cylindrically-shaped terminal bushing end-clamp secured to one end of said terminal stud and assisting in maintaining said weather-proof casings in compression, and an interrupting assemblage detachably secured to said terminal bushing end-clamp.

16. A circuit interrupter of the single bushing type including only a single terminal bushing, said terminal bushing including a pair of axially disposed weather-proof casings with mounting means disposed between the two weather-proof casings, a terminal stud extending axially through the terminal bushing, a cylindrically-shaped terminal bushing end-clamp secured to one end of said terminal stud and assisting in maintaining said weather-proof casings in compression, a weather-proof interrupting casing, an interrupting assemblage extending within said weather-proof interrupting casing and detachably secured to said terminal bushing end-clamp, and compression means for maintaining said interrupting assemblage in tension and said weather-proof interrupting casing in compression.

17. A circuit interrupter including an insulating interrupting single support tube, a plurality of relatively stationary annular orifice structures spaced along the interrupting tube interiorly thereof and secured thereto, each of said relatively stationary annular orifice structures including an outer orifice member and an inner insulating sleeve, an insulating operating tie-rod carrying a plurality of spaced movable cylindrical contacts and movable axially of said interrupting tube interiorly of the inner insulating sleeves, a plurality of relatively stationary contacts spaced along said interrupting tube and cooperable with the movable cylindrical contacts to establish a plurality of serially related arcs extending within the annular orifice structures, each stationary contact including a plurality of circumferentially-disposed spaced contact segments, fluid-passage means between at least some of the contacts, fluid driving means operated by said tie-rod for driving fluid through said fluid passage means, and means setting up a radial magnetic field across a plurality of said annular orifice structures to effect rotation of the arcs therein.

18. The circuit interrupter according to claim 17 wherein said fluid-driving means includes a pair of spaced piston members disposed on the opposite sides of each of a plurality of the annular orifice structures and carried by said operating tie-rod, whereby the pistons associated with each annular orifice structure define with the surrounding interrupting tube an inlet region and an exhaust region for the annular orifice structures for fluid-blast flow therethrough.

19. The circuit interrupter according to claim 17 wherein said radial magnetic field means is provided by a permanent magnet sleeve disposed interiorly of each of said inner insulating sleeves.

20. A circuit interrupter including means at least partly of insulating material defining a relatively stationary annular orifice structure, the relatively stationary annular orifice structure including an outer insulating orifice member and an inner insulating sleeve, a permanent magnet sleeve disposed interiorly of said inner insulating sleeve, and ring-shaped separable contact means for establishing an arc through said annular orifice structure, whereby the established arc may rotate around said ring-shaped separable contact means within said annular orifice structure until the arc is extinguished.

21. The circuit interrupter according to claim 20 wherein a washer-shaped magnetic member extends laterally outwardly of said permanent magnet sleeve for distribution of the radial magnetic field flux in a more effective manner.

22. A circuit interrupter including means at least partly of insulating material defining a relatively stationary annular orifice structure, the relatively stationary annular orifice structure including an outer insulating orifice member and an inner insulating sleeve, a permanent magnet sleeve disposed interiorly of said inner insulating sleeve, and ring-shaped separable contact means for establishing an arc through said annular orifice structure, whereby the established arc may rotate around said ring-shaped separable contact means within said annular orifice structure until the arc is extinguished, and fluid piston means actuated by said separable contact means for forcing fluid longitudinally of said annular orifice structure.

23. The circuit interrupter according to claim 22 wherein the fluid piston means includes a pair of spaced pistons disposed on opposite sides of the annular orifice structure and at least partially defining entrance and exhaust regions for the annular orifice structure.

24. A fluid-blast circuit interrupter including an interrupting insulating support tube having pairs of spaced openings provided in the wall thereof, an operating rod movable axially with respect to said insulating support tube and carrying a plurality of movable contacts therewith, at least one relatively stationary contact assembly including a plurality of spaced circumferentially-disposed U-shaped contacts, each U-shaped contact extending through a pair of said spaced openings, one end of a plurality of said U-shaped contacts collectively forming said relatively stationary contact assembly, said operating rod carrying a plurality of spaced piston members therewith, at least one of said piston members cooperating with said interrupting tube to force fluid to flow toward an arc, at least one of said movable pistons separating the exhaust region of one arc from the inlet region of the immediately adjacent arc, and the exhaust pressure from one arc assisting the adjoining piston member to move so as to force fluid toward the adjoining arc.

25. The combination of claim 24, wherein one or more garter tension springs encircle the support tube to hold the one or more contact assemblies in place.

26. The combination of claim 24, wherein the other ends of the U-shaped contacts bear in contacting relation with the side of the adjoining movable contact.

References Cited in the file of this patent

UNITED STATES PATENTS

| | | |
|---|---|---|
| 2,064,652 | Flurscheim | Dec. 15, 1936 |
| 2,103,121 | Slepian | Dec. 21, 1937 |
| 2,140,378 | Biermanns et al. | Dec. 13, 1938 |
| 2,227,134 | Hara | Dec. 31, 1940 |
| 2,253,009 | Baker | Aug. 19, 1941 |
| 2,261,020 | Crabbs | Oct. 28, 1941 |
| 2,333,598 | Strom | Nov. 2, 1943 |
| 2,411,892 | Peters | Dec. 3, 1946 |
| 2,459,599 | Strom | Jan. 18, 1949 |
| 2,534,920 | Ludwig et al. | Dec. 19, 1950 |
| 2,667,556 | Van Sickle et al. | Jan. 26, 1954 |
| 2,725,446 | Slepian | Nov. 29, 1955 |

FOREIGN PATENTS

| | | |
|---|---|---|
| 197,972 | Switzerland | Aug. 16, 1938 |
| 1,115,350 | France | Dec. 26, 1955 |